(12) United States Patent
Venkatramani et al.

(10) Patent No.: US 8,285,914 B1
(45) Date of Patent: Oct. 9, 2012

(54) BANKED MEMORY ARBITER FOR CONTROL MEMORY

(75) Inventors: Anjan Venkatramani, Los Altos, CA (US); Srinivas Perla, San Jose, CA (US); John Keen, Mountain View, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 576 days.

(21) Appl. No.: 11/829,648

(22) Filed: Jul. 27, 2007

Related U.S. Application Data

(60) Provisional application No. 60/911,974, filed on Apr. 16, 2007.

(51) Int. Cl.
*G06F 12/00* (2006.01)

(52) U.S. Cl. ...... 711/5; 711/158; 711/167; 711/E12.001

(58) Field of Classification Search .................. 711/106, 711/151, 158
See application file for complete search history.

(56) References Cited

U.S. PATENT DOCUMENTS

| | | | | |
|---|---|---|---|---|
| 5,214,769 A | * | 5/1993 | Uchida et al. | 711/151 |
| 5,265,231 A | * | 11/1993 | Nuwayser | 711/106 |
| 5,323,489 A | * | 6/1994 | Bird | 711/167 |
| 6,119,199 A | * | 9/2000 | Isobe | 711/5 |
| 6,578,117 B2 | * | 6/2003 | Weber | 711/151 |
| 6,871,261 B1 | * | 3/2005 | Proebsting | 711/106 |
| 6,877,077 B2 | * | 4/2005 | McGee et al. | 711/158 |
| 2002/0053004 A1 | * | 5/2002 | Pong | 711/119 |
| 2003/0051108 A1 | * | 3/2003 | Chen et al. | 711/158 |
| 2003/0120861 A1 | * | 6/2003 | Calle et al. | 711/105 |
| 2004/0030849 A1 | * | 2/2004 | Borkenhagen et al. | 711/156 |
| 2005/0091460 A1 | * | 4/2005 | Rotithor et al. | 711/158 |
| 2006/0026342 A1 | * | 2/2006 | Calvignac et al. | 711/105 |
| 2006/0123169 A1 | * | 6/2006 | Chai et al. | 710/116 |

FOREIGN PATENT DOCUMENTS

WO    WO 0233556 A2 * 4/2002

OTHER PUBLICATIONS

Scott Rixner. "Memory Controller Optimizations for Web Servers." Dec. 2004. IEEE. MICRO '04.*
Kyle J. Nesbit, Nidhi Aggarwal, James Laudon, and James E. Smith. "Fair Queuing Memory Systems." Dec. 2006. IEEE. MICRO '06.*
Scott Rixner, William J. Dally, Ujval J. Kapasi, Peter Mattson, and John D. Owens. "Memory Access Scheduling." 2000. IEEE. ISCA '00.*
Jun Shao and Brian T. Davis. "A Burst Scheduling Access Reordering Mechanism." Feb. 2007. IEEE. HPCA '07.*
H. Jonathan Chao. "A Novel Architecture for Queue Management in the ATM Network." Sep. 1991. IEEE. IEEE Journal on Selected Areas in Communications. vol. 9. No. 7. pp. 1110-1118.*

(Continued)

*Primary Examiner* — Kevin Ellis
*Assistant Examiner* — Nathan N Sadler
(74) *Attorney, Agent, or Firm* — Harrity & Harrity, LLP

(57) ABSTRACT

A device includes a memory that includes a number of banks. The device receives requests for accessing the memory, determines the banks to which the requests are intended, determines one or more of the banks that are available, selects one or more of the requests to send to the memory based on the one or more of the banks that are available and have a request to be serviced, and sends the selected one or more requests to the memory.

38 Claims, 12 Drawing Sheets

OTHER PUBLICATIONS

Steven L. Scott and James R. Goodman. "Performance of Pruning-Cache Directories for Large-Scale Multiprocessors." May 1993. IEEE. IEEE Transactions on Parallel and Distributed Systems. vol. 4. No. 5. pp. 520-534.*

Microsoft Press. Microsoft Computer Dictionary. May 2002. 5th ed. Definition of pointer.*

Micron Technology Inc., 288 Mb CIO Reduced Latency (RLDRAM® II), Sep. 2006, 50 pages.

* cited by examiner

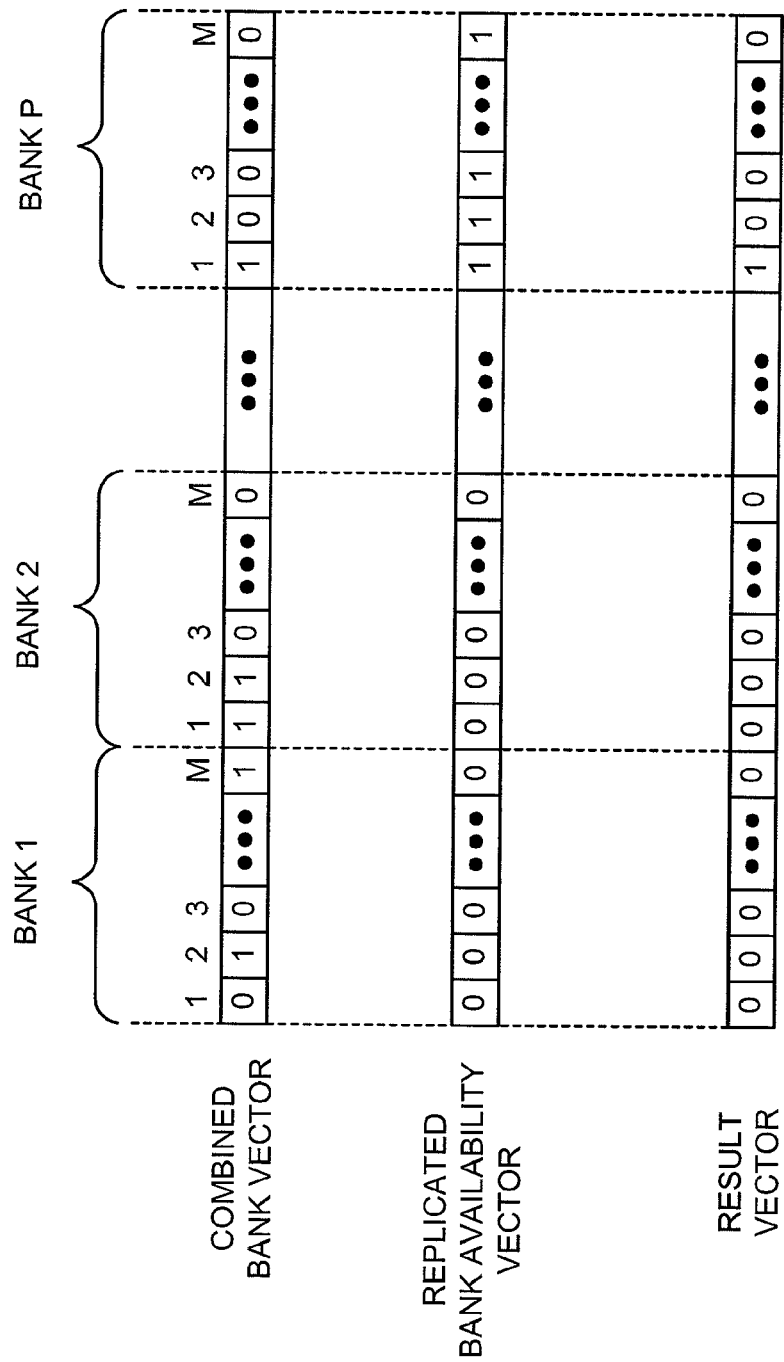

US 8,285,914 B1

BANKED MEMORY ARBITER FOR CONTROL MEMORY

RELATED APPLICATION

This application claims priority from U.S. Provisional Application No. 60/911,974, filed Apr. 16, 2007, entitled "MEMORY SCHEMES," the content of which is hereby incorporated by reference.

BACKGROUND

Network devices, such as routers, receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was added.

To meet the new demands, purpose-built routers were designed. Purpose-built routers are designed and built with components optimized for routing. These routers not only handle higher line rates and higher network traffic volume, but they also add functionality without compromising line rate performance.

SUMMARY

According to one aspect, a data processing device may include a memory that includes a number of banks, a group of requestors that generate requests for accessing the memory, a group of bank queues corresponding to the banks, and a control block. The control block may receive the requests from the requestors, identify the banks to which the requests are intended, store information associated with the requests in the bank queues corresponding to the identified banks, select one or more of the requests to send to the memory based on the information stored in the bank queues, and send the selected one or more of the requests to the memory.

According to another aspect, a data processing device may include a memory that includes a number of banks, a group of requestors that generate requests for accessing the memory, and a control block. The control block may receive the requests from the requestors, determine the banks to which the requests are intended, determine one or more of the banks that are available, select one or more of the requests to send to the memory based on which of the one or more of the banks that are available and have a request to be serviced, and send the selected one or more requests to the memory.

According to yet another aspect, a device may include a memory that includes a number of memory parts, where each of the memory parts may include a number of banks. The device may also include a group of requestors to issue requests for accessing the memory and a control block connected to the memory parts via corresponding buses. The control block may receive the requests, determine the banks to which the requests are intended, determine the banks that are available for each of the plurality of memory parts, select one or more of the requests to transmit to the memory based on the determined banks to which the requests are intended and the determined banks that are available, and transmit the selected one or more requests via one or more of the buses.

According to a further aspect, a method performed by a device that includes a memory and a group of requestors is provided. The memory may include a number of memory parts, where each of the memory parts may include a number of banks, and the requestors may issue requests for accessing the memory. The method may include receiving the requests from the requestors; determining the banks to which the requests are intended; determining the banks that are available for each of the memory parts; selecting one or more of the requests to transmit to the memory based on the determined banks to which the requests are intended and the determined banks that are available; and transmitting the selected one or more requests to the memory.

According to another aspect, a method performed by a device that includes a memory and a group of requestors is provided. The memory may include a number of memory parts, where each of the memory parts may include a number of banks, and the requestors may issue requests for accessing the memory. The method may include receiving the requests from the requestors; determining the banks to which the requests are intended; determining the banks that are available for each of the memory parts; selecting, based on the determined banks to which the requests are intended and the determined banks that are available, multiple ones of the requests to transmit to the memory so that multiple ones of the memory parts are serviced in a given clock cycle; and transmitting the selected requests to the memory in the given clock cycle.

According to a further aspect, a device may include means for providing a memory that includes a number of banks; means for receiving requests for accessing the memory; means for determining the banks to which the requests are intended; means for determining one or more of the banks that are available; means for selecting one or more of the requests to send to the memory based on the one or more of the banks that are available and have a request to be serviced; and means for sending the selected one or more requests to the memory.

BRIEF DESCRIPTION OF THE DRAWINGS

The accompanying drawings, which are incorporated in and constitute a part of this specification, illustrate one or more implementations described herein and, together with the description, explain aspects of these implementations. In the drawings:

FIG. 9 is a diagram of an exemplary result vector;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Implementations described herein provide techniques for efficiently and fairly accessing a memory device. These techniques will be described in the context of multiple requestors attempting to gain access to the memory device to either read or write data.

In the description to follow, the memory device will be described as a control memory of a network device that stores data structures for use in processing packets. In other implementations, the memory device may be included in another type of data processing device and may store other types of data.

EXEMPLARY DATA PROCESSING DEVICE

Figure 1:
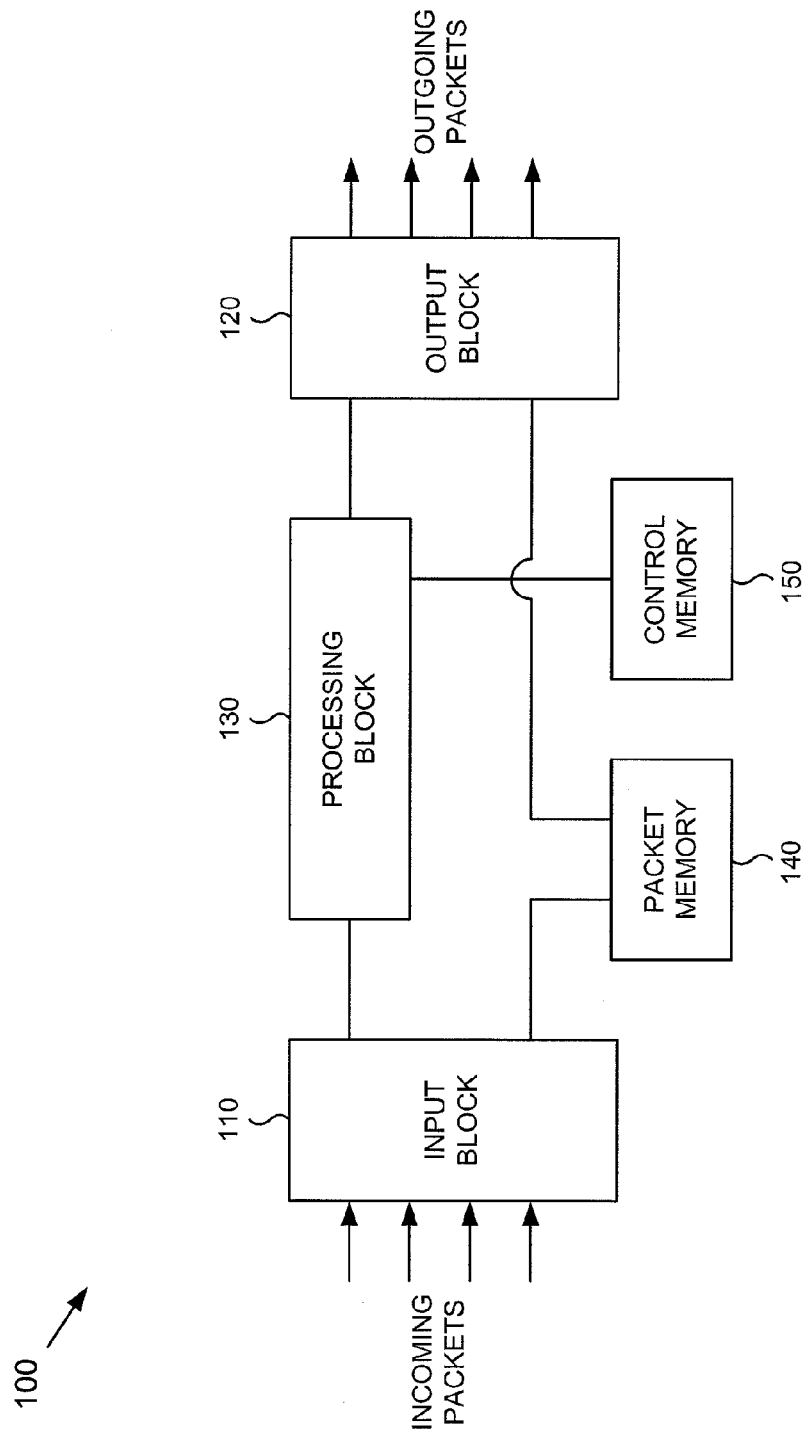
FIG. 1 is a diagram of an exemplary data processing device in which systems and methods described herein may be implemented.

FIG. 1 is a diagram of an exemplary data processing device 100 in which systems and methods described herein may be implemented. Device 100 may include input block 110, output block 120, processing block 130, packet memory 140, and control memory 150.

Input block 110 may include one or more input units (e.g., input line cards) that may receive packets on ingress links and perform initial processing on the packets. In one implementation, the initial processing may include analyzing a packet to identify its control information and its packet data (e.g., payload). The control information may include information from the header of the packet, and the packet data may include information from a payload of the packet. In one implementation, the control information may include a source address and/or a destination address from a header of a packet. In another implementation, the control information may include a source address, a destination address, priority information, and/or other information from a header of the packet. Output block 120 may include one or more output units (e.g., output line cards) that may receive packet information from processing block 130 and/or packet memory 140, construct packets from the packet information, and output the packets on egress links.

Processing block 130 may include processing logic that may perform routing functions and handle packet transfers between input block 110 and output block 120. Processing block 130 may receive the control information from input block 110 and process the control information based on data structures stored in control memory 150. When processing the control information, processing block 130 may make certain requests to control memory 150 to read and/or write data.

Figure 2:
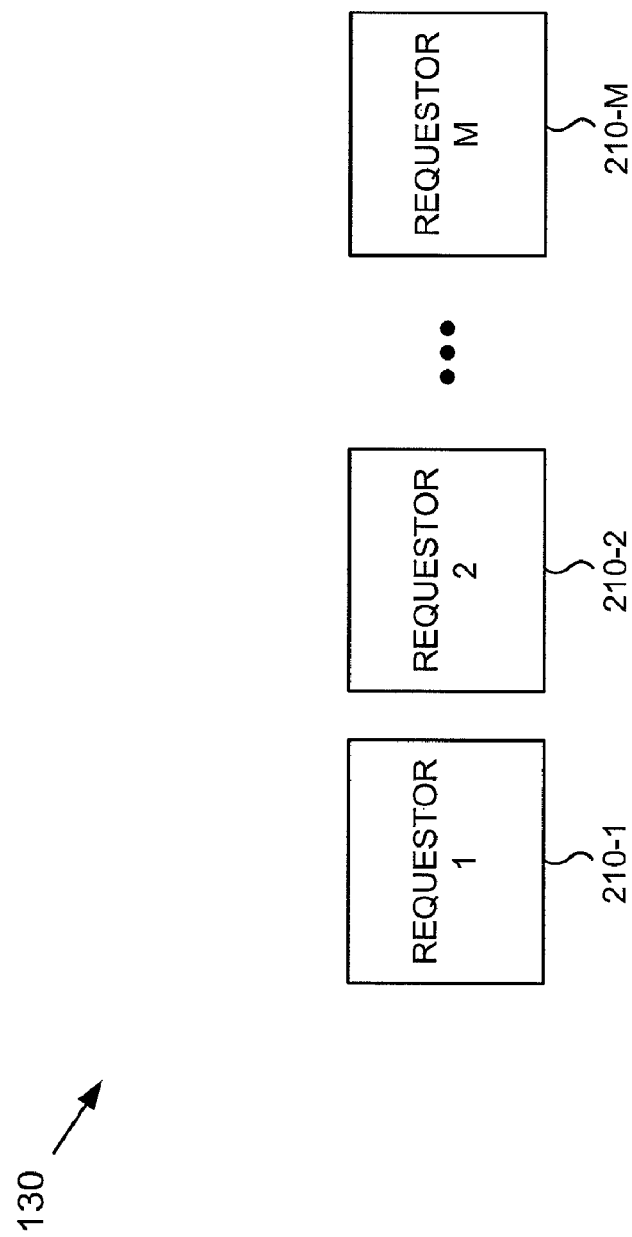
FIG. 2 is a diagram of an exemplary portion of the processing block of FIG. 1.

FIG. 2 is a diagram of an exemplary portion of processing block 130. Processing block 130 may include multiple requestors 210-1, 210-2, . . . , 210-M (where M>1) (collectively referred to herein as "requestors 210"). Requestors 210 may operate independently of each other and/or in parallel. Each of requestors 210 may include processing logic to process control information associated with a particular packet. Each of requestors 210 may make requests to control memory 150 to read and/or write data to assist in the processing of the control information. In one implementation, a requestor 210 may determine how to forward a packet (e.g., determine on which egress link the packet should be transmitted), collect particular statistics regarding the packet, and/or perform one or more management functions with regard to the packet.

Returning to FIG. 1, packet memory 140 may include a memory device, such as a dynamic random access memory (DRAM). Packet memory 140 may store packet data associated with packets received by input block 110. In one implementation, packet memory 140 may store the packet data as a variable length data unit. In another implementation, packet memory 140 may store the packet data as fixed length data units. In this case, the packet data may be divided into one or more of the data units of the fixed length and stored in contiguous or non-contiguous locations in packet memory 140. If stored in non-contiguous locations, data structures, such as linked lists, may be used to identify the data units associated with a particular packet.

Control memory 150 may include a memory device, such as a DRAM or a reduced-latency DRAM (RLDRAM). Control memory 150 may store data structures to assist in the processing of packets. In one implementation, the data structures might include a routing table, a forwarding table, statistics, and/or management data (e.g., quality of service (QoS) parameters).

Figure 3:
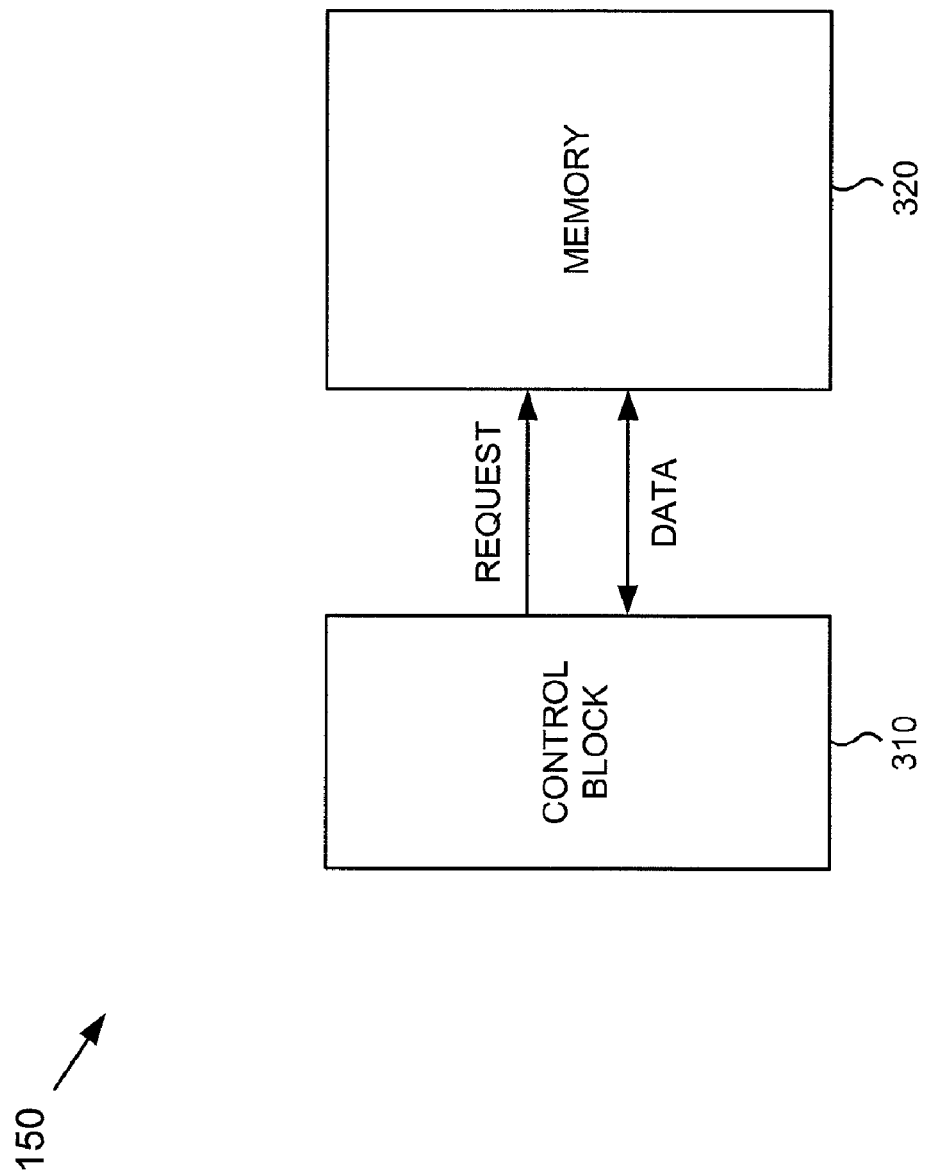
FIG. 3 is a diagram of an exemplary portion of the control memory of FIG. 1.

FIG. 3 is a diagram of an exemplary portion of control memory 150. Control memory 150 may include a control block 310 and a memory 320. Control block 310 may include logic that regulates access to memory 320. For example, control block 310 may receive requests from requestors 210 and identify which request(s) to forward to memory 320. In this case, control block 310 may function as an arbiter that arbitrates among the requests. Control block 310 may connect to memory 320 via a bus over which requests can be sent to memory 320 and data can be written to or read from memory 320.

Figure 4:
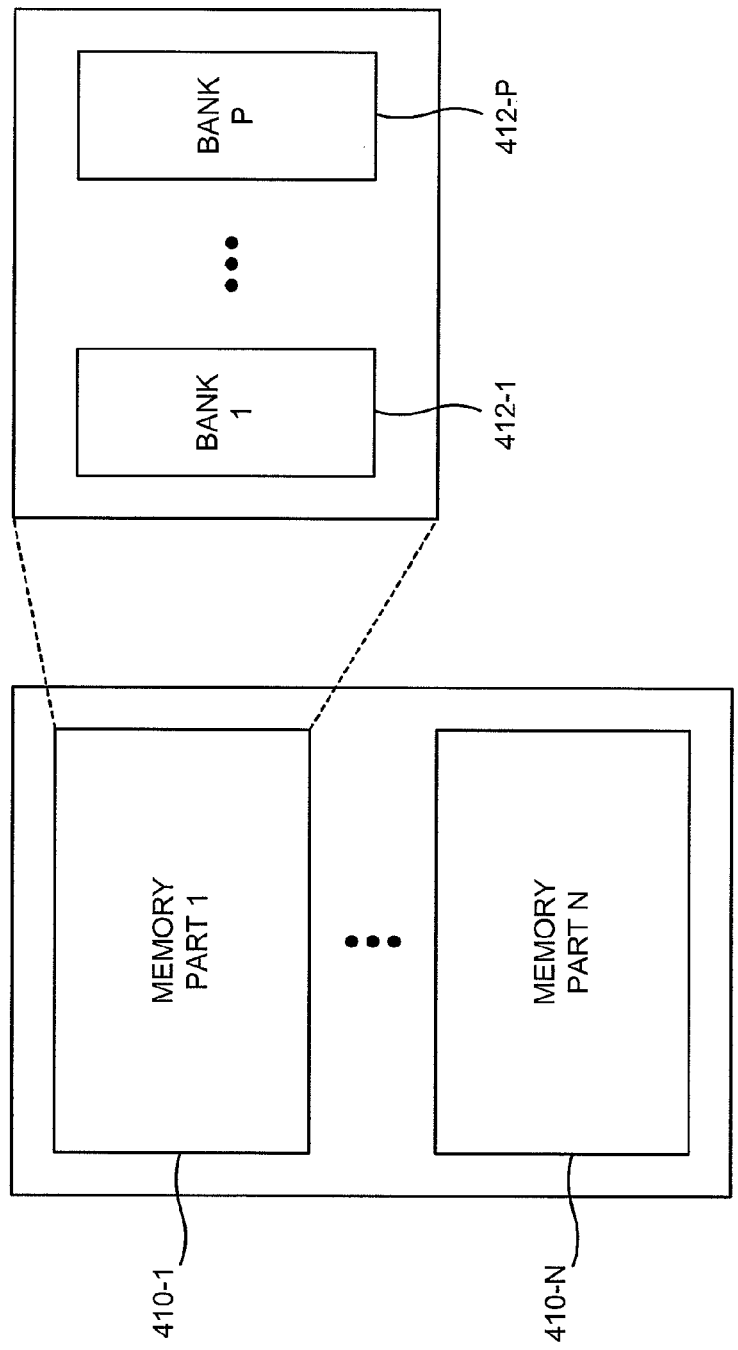
FIG. 4 is a diagram of an exemplary portion of the memory of FIG. 3.

Memory 320 may store the data structures. FIG. 4 is a diagram of an exemplary portion of memory 320. Memory 320 may include memory parts 410-1, . . . , 410-N (where N≧1) (collectively referred to herein as "memory parts 410"). In one implementation, each of memory parts 410 may store a replicated set of data. In another implementation, each of memory parts 410 may store a different set of data. Control block 320 may include a separate bus for each of memory parts 410, such that a separate request can be sent concurrently to each of memory parts 410. In this case, memory parts 410 may operate independently of each other. Reads may be performed on one of memory parts 410. Writes may be performed on all or multiple ones of memory parts 410 to maintain consistency.

Each of memory parts 410 may be organized into banks 412-1, . . . , 412-P (where P>1) (collectively referred to herein as "banks 412"). Memory 320 may have restrictions on how often a particular bank 412 can be accessed. For example, the restriction may specify that a certain number of clocks cycles (e.g., 3 clock cycles) pass between one access of a bank 412 and a next access of that same bank 412 (herein referred to as "access delay").

EXEMPLARY PACKET FORWARDING PROCESS

Figure 5:
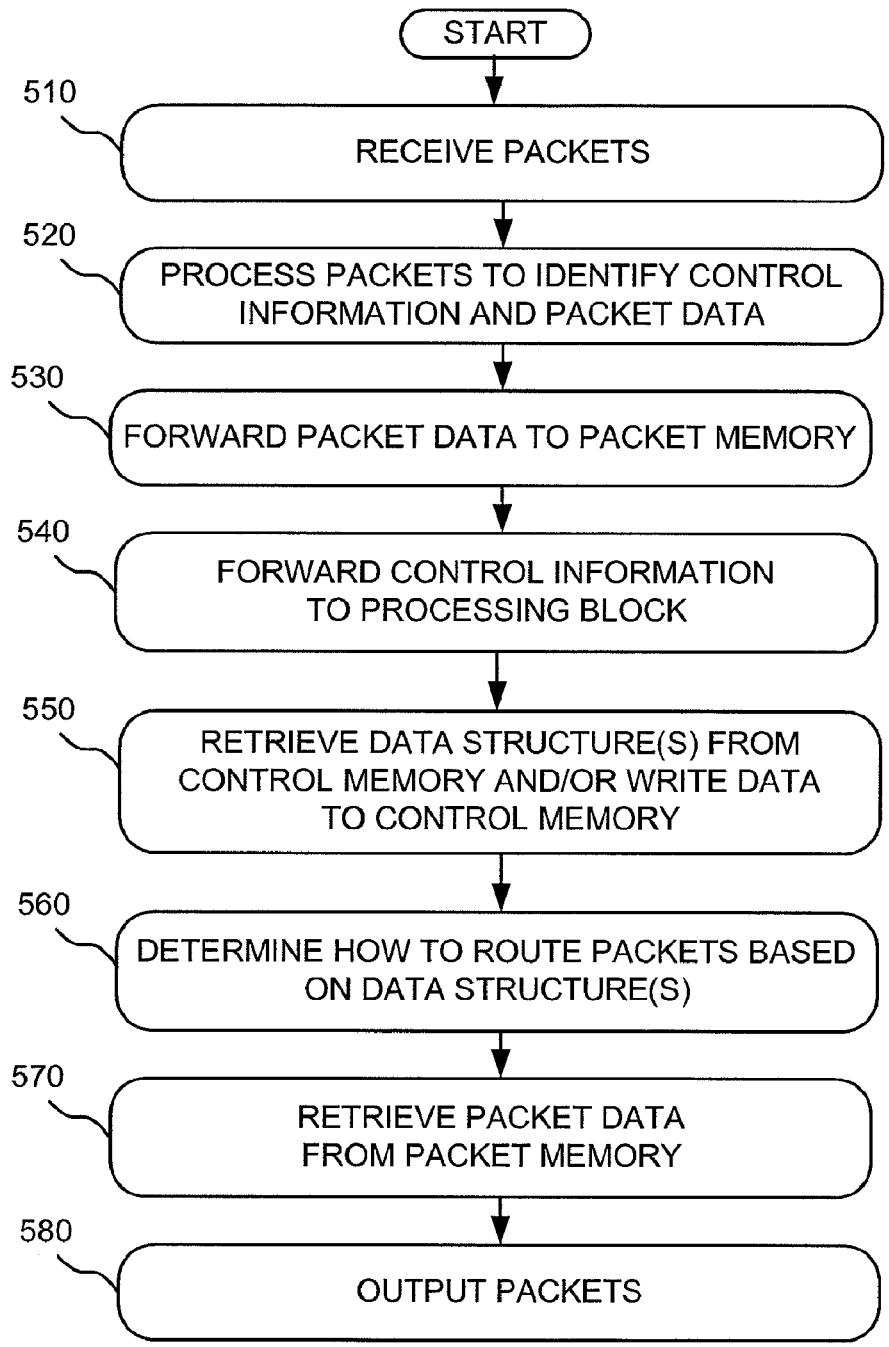
FIG. 5 is a flowchart of an exemplary process for forwarding a packet by the data processing device of FIG. 1.

FIG. 5 is a flowchart of an exemplary process for forwarding a packet by data processing device 100. Processing may begin with packets being received (block 510). For example, input block 110 may receive packets on one or more ingress links. The packets may be associated with a single stream of packets received on a particular ingress link or multiple streams of packets received on multiple ingress links.

The packets may be processed to identify their control information and their packet data (block 520). For example, input block 110 may analyze the packets to determine packet data and control information associated with the packets. As described above, the packet data may be retrieved from the payload of the packets and the control information may be retrieved from the header of the packets.

The packet data may be forwarded to packet memory 140 and the control information may be forwarded to processing block 130 (blocks 530 and 540). For example, input block 110 may send the packet data for storage in packet memory 140. As described above, the packet data associated with a particular packet may be stored in packet memory 140 as a variable sized data unit or as one or more fixed sized data units.

One or more data structures may be retrieved from control memory 150 and/or data may be written to control memory 150 (block 550). For example, a requestor 210 of processing block 130 may process control information associated with a packet. Requestor 210 may retrieve one or more data structures, such as a forwarding table, a routing table, and/or management data, from control memory 150. Requestor 210 may also, or alternatively, write one or more data structures, such as statistics data, to control memory 150. Requestor 210 may read or write data by sending a request to control memory 150. Requestors 210 may operate independently from each other and, thus, the requests from requestors 210 form an unpredictable (almost random) access pattern across banks 412 of control memory 150.

It may be determined how to route the packets based on the one or more data structures retrieved from control memory 150 (block 560). For example, requestor 210 may process the control information for a packet based on the forwarding table, routing table, and/or management data to determine how the packet should be routed (e.g., on which egress link the packet should be transmitted, the priority to be given to the packet, etc.). Requestor 210 may send its processing results to output block 120. The processing results may identify the packet and the egress link on which the packet should be transmitted and might include header information associated with the packet.

Packet data may be retrieved from packet memory 140 (block 570). For example, output block 120 may receive processing results for a packet from a requestor 210 of processing block 130. Output block 120 may retrieve the packet data corresponding to the packet from packet memory 140 and reassemble the packet based on the packet data and the processing results from requestor 210.

The packets may be outputted on one or more egress links (block 580). For example, output block 120 may transmit the packets based on the processing results from requestors 210 of processing block 130.

EXEMPLARY FUNCTIONAL BLOCK DIAGRAM OF DATA PROCESSING DEVICE

Figure 6:
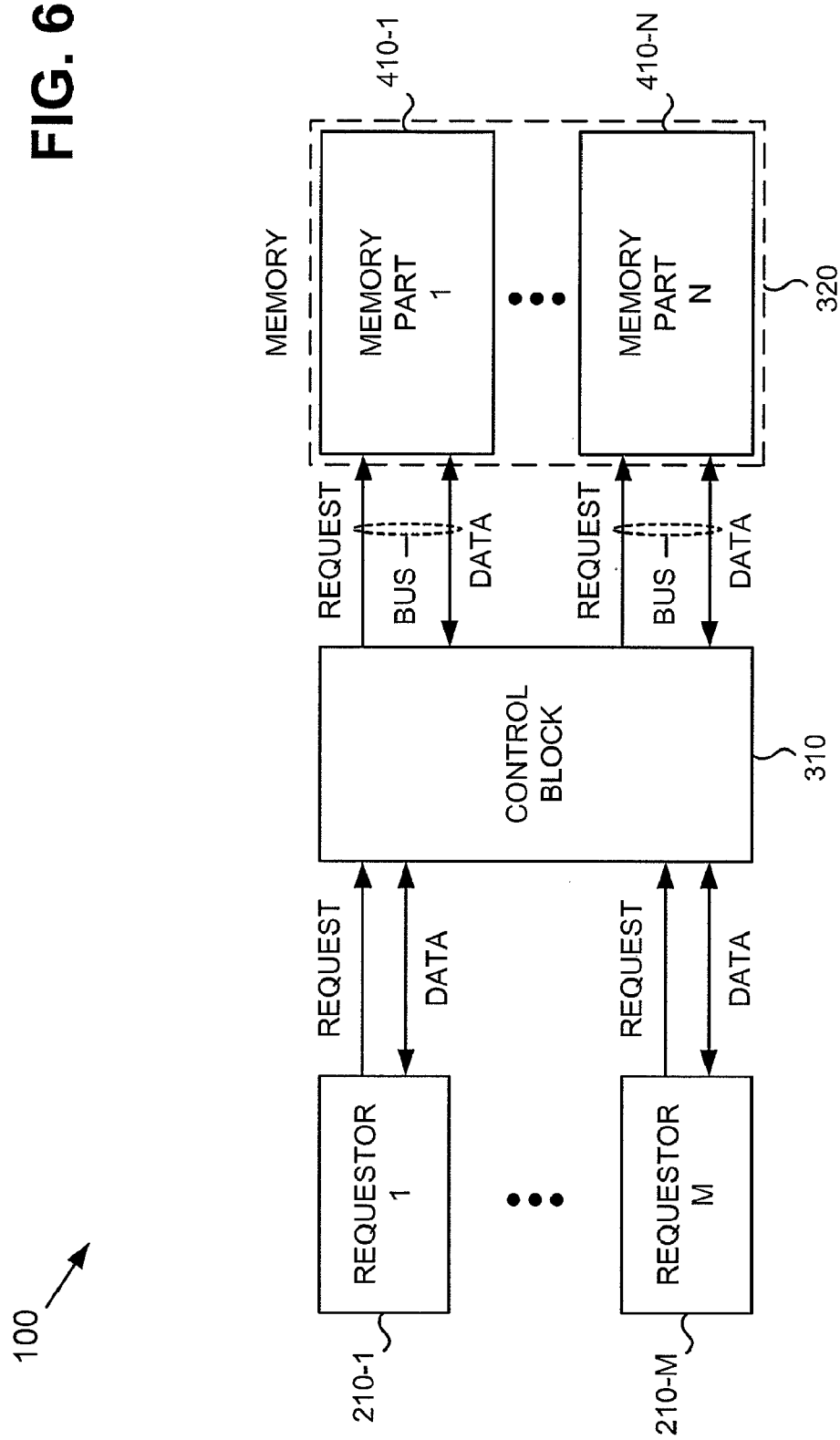
FIG. 6 is a functional block diagram of an exemplary portion of the data processing device of FIG. 1.

Implementations described herein may relate to regulating access to control memory 150 by requestors 210, as described generally with regard to block 550. FIG. 6 is a functional block diagram of an exemplary portion of data processing device 100. As shown in FIG. 6, data processing device 100 may include requestors 210 connected to memory parts 410 of memory 320 via control block 310. Each of requestors 210 may send requests to control block 310 for access to memory 320. Control block 310 may function as an arbiter to control which requests to transmit to memory parts 410 of memory 320.

When servicing the requests, control block 310 may attempt to achieve the following goals: (1) prevent starvation (e.g., try to not indefinitely postpone a request while servicing other requests); (2) fairness (e.g., try to service all requestors 210 fairly to give them a fair amount of bandwidth with respect to control memory 150); and/or (3) memory efficiency (e.g., try to use all of memory parts 410 and banks 412 as much as possible). Control block 310 may attempt to achieve these goals while operating under certain memory constraints. For example, there may be a certain (finite) delay to read or write data (e.g., it may take a predetermined number of clock cycles to read or write data). Also, there may be a single bus between control block 310 and each of memory parts 410. A single request may be sent from control block 310 to one of memory parts 410 on the bus during a given clock cycle.

Figure 7:
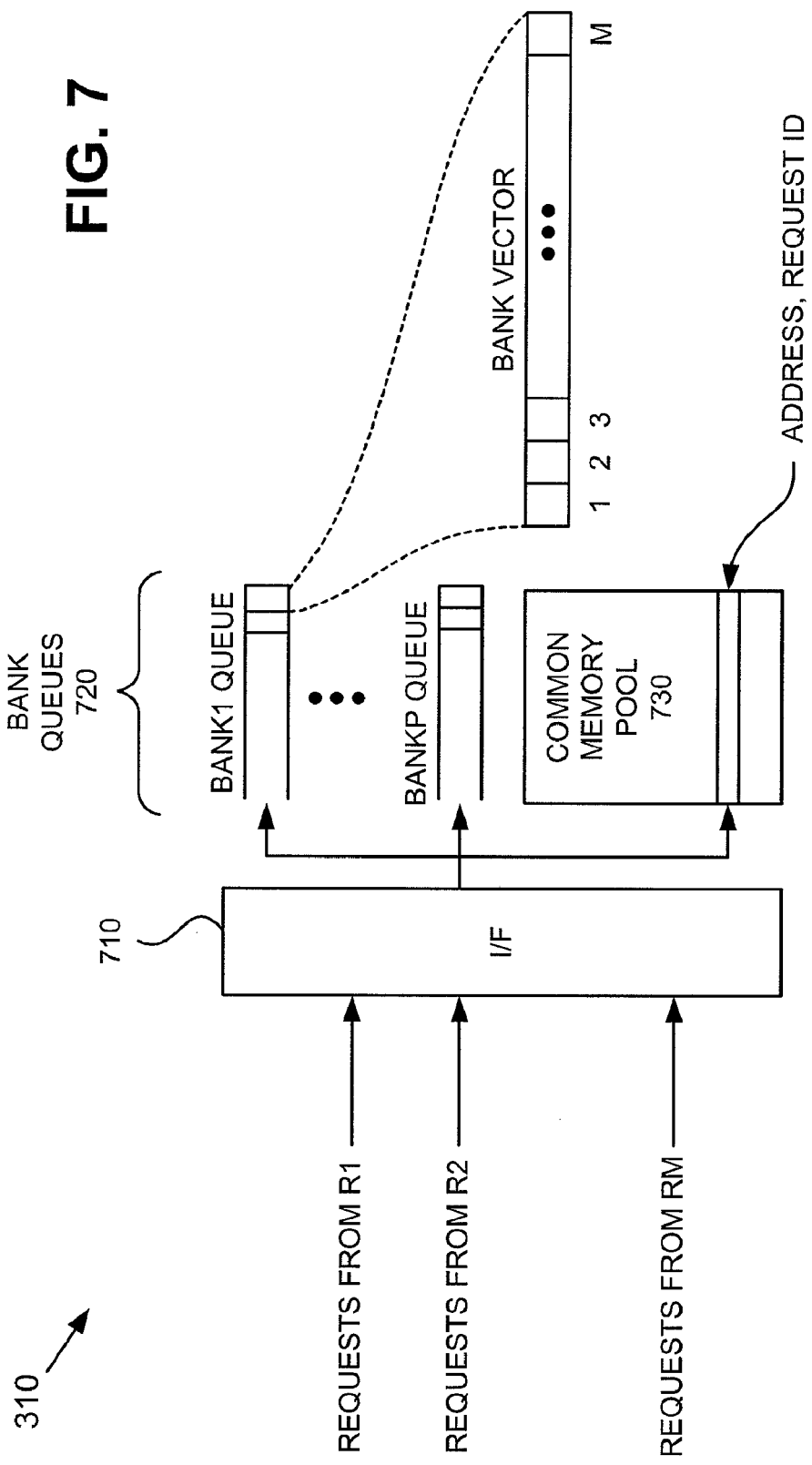
FIG. 7 is a diagram of an exemplary portion of the control block of FIG. 6.

FIG. 7 is a diagram of an exemplary portion of control block 310. As shown in FIG. 7, control block 310 may include an interface (I/F) 710, a set of bank queues 720, and a common memory pool 730. Bank queues 720 may include a separate queue for each of banks 412. Interface 710 may include a mechanism to receive requests from requestors 210 and provide the requests to bank queues 720 and common memory pool 730.

A request from a requestor 210 may include an address and valid signal. The address may identify the location in memory 320 to read or write data. In one implementation, the lower ceiling ($\log_2 P$) bits of the address (where ceiling( ) is a function that rounds up to the nearest integer) may identify a bank 412 to be accessed and, thus, a corresponding one of bank queues 720. The valid signal may identify whether the request is valid.

Control block 310 may store information associated with a valid request in common memory pool 730. In one implementation, the information may include the address from the request along with an identifier corresponding to the requestor 210 from which the request was received ("request ID"). Control block 310 may store an address corresponding to the location in common pool memory 730 at which the information was stored in the appropriate one of bank queues 720. The address in a bank queue 720 may be used to facilitate retrieval of the information from common memory pool 730.

Control block 310 may analyze the requests received in a clock cycle and determine to which banks 412 the requests are intended. Control block 310 may generate a bank vector for each of banks 412 at each clock cycle and store the bank vectors in corresponding ones of bank queues 720.

The bank vector may include a number of fields corresponding to the number of requestors 210. Each of the fields may store a request bit that indicates whether the corresponding one of requestors 210 requests access to the corresponding one of banks 412 and, for a valid request, an address that corresponds to the location in common pool memory 730 at which the address for the request was stored. The request bit may be set to a first value in a field of the bank vector to indicate that the corresponding one of requestors 210 requests access to the corresponding one of banks 412, or to a second value to indicate that the corresponding requestor 210 does not request access to the corresponding bank 412. For example, if control block 310 receives requests from requestors 210-1 through 210-M during a certain clock cycle and determines that the requests from requestors 210-1 and 210-M are intended for bank 412-P, control block 310 may generate a bank vector in which the request bit in the first field (corresponding to requestor 210-1) and the request bit in the last field (corresponding to requestor 210-M) are set to a first value and the request bits in the other fields are set to a second value.

Figure 8:
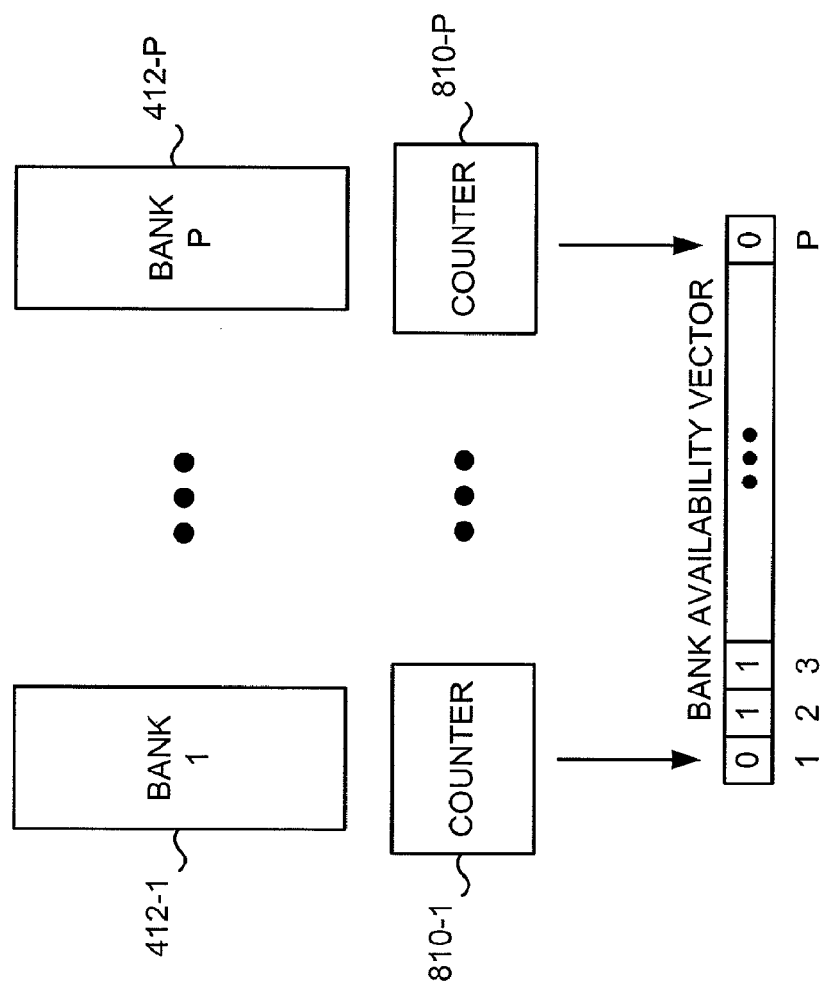
FIG. 8 is a diagram of exemplary counters that may be associated with banks of the memory parts of FIG. 6.

To identify which banks 412 are available in memory 320 to service requests, control block 310 may maintain a number of counters. FIG. 8 is a diagram of exemplary counters 810-1, ..., 810-P that may be associated with banks 412 of one of memory parts 410. Similar counters may be associated with banks 412 of other memory parts 410.

As shown in FIG. 8, a separate counter 810-1, ..., 810-P (collectively referred to as "counters 810") may be associated with each of banks 412-1, ..., 412-P. In one implementation, each of counters 810 is set to a predetermined value whenever a request is sent to the corresponding bank 412. The predetermined value may correspond to the access delay (in clock cycles) associated with memory 320. Thus, a counter 810 may reflect how many clock cycles to wait before another access to the corresponding bank 412 can occur. In one implementation, counters 810 may count downward from the predetermined value to a zero value. Any counter 810 with a non-zero value may indicate that the corresponding bank 412 is unavailable for access. Any counter 810 with a zero value may indicate that the corresponding bank 412 is available for access.

Control block 310 may generate a bank availability vector for each of memory parts 410 that indicates whether each of the corresponding banks 412 is available for access. The bank availability vector may include a number of bits corresponding to the number of banks 412. A bit may be set to a first value to indicate that the corresponding bank 412 is available or to a second value to indicate that the corresponding bank 412 is unavailable. In one implementation, control block 310 may generate a bank availability vector in each clock cycle to indicate which banks 412 are available during that clock cycle.

Control block 310 may generate a result vector that may identify which banks 412 are available and have requests to be serviced. FIG. 9 is a diagram of an exemplary result vector that may be generated for a memory part 410. As shown in FIG. 9, control block 310 may generate a combined bank vector and a replicated bank availability vector. The combined bank vector may include a vector generated based on a concatenation of the bank vectors at the head of bank queues 720 (e.g., a concatenation of the request bits in the bank vectors). The replicated bank availability vector may include each bit of the bank availability vector replicated to M bits. In other words, if the bank availability vector includes a bit that indicates that bank 412-P is available (e.g., set to 1), then the replicated bank availability vector would include M 1's for the portion of the replicated bank availability vector corresponding to bank 412-P, as shown in FIG. 9.

In an alternative implementation, control block 310 may use multiple bank vectors from each of bank queues 720 to generate the combined bank vector. For example, control block 310 may combine the top N bank vectors in bank queues 720 to generate the combined bank vector. This may be beneficial to more fully use memory parts 410.

Control block 310 may generate the result vector based on the combined bank vector and the replicated bank availability vector. In one implementation, control block 310 may perform a logical AND operation on the bits in the combined bank vector and the replicated bank availability vector to form the result vector. The result vector may indicate which banks 412 are available and have requests to be serviced.

Figure 10:
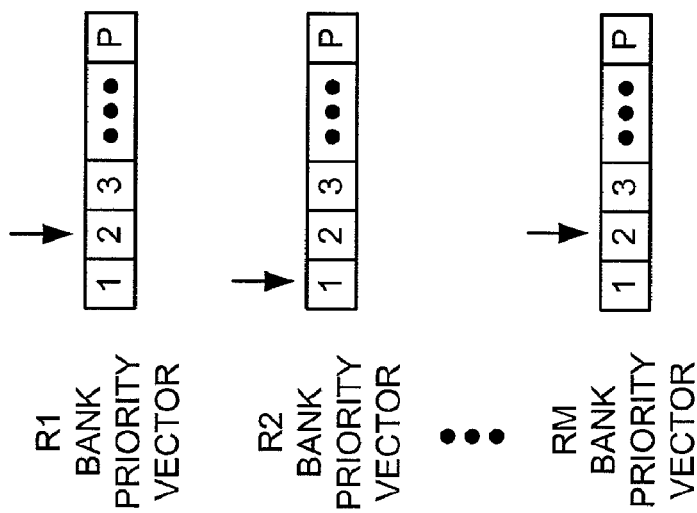
FIG. 10 is a diagram of exemplary per-requestor bank priority vectors.

Control block 310 may generate a per-requestor bank priority vector and/or a requestor priority vector. FIG. 10 is a diagram of exemplary per-requestor bank priority vectors. As shown in FIG. 10, a bank priority vector may be generated for each of requestors 210. A bank priority vector may include a number of slots that identify the different banks 412. The length of the bank priority vector may be programmable. A particular bank 412 may be identified in one or more slots. For a fair servicing of banks 412, each of banks 412 may be identified in an equal number of slots. Control block 310 may maintain a pointer (or use another technique) to identify which bank 412 is the highest priority bank for a current clock cycle.

Figure 11:
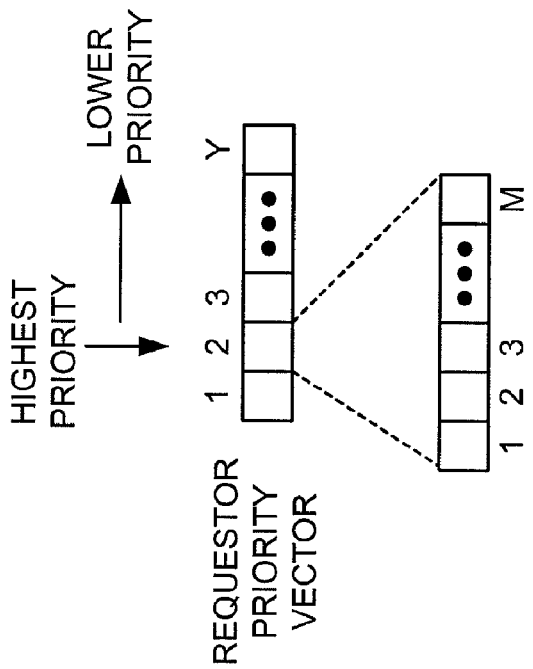
FIG. 11 is a diagram of an exemplary requestor priority vector.

FIG. 11 is a diagram of an exemplary requestor priority vector. As shown in FIG. 11, a requestor priority vector may be generated that includes a number of slots (e.g., Y slots, where $Y \geq M$) that identify the different requestors 210. In one implementation, each slot may include a vector that identifies one of requestors 210. The length of the requestor priority vector may be programmable. A particular requestor 210 may be identified in one or more slots. For a fair servicing of requestors 210, each of requestors 210 may be identified in an equal number of slots. Control block 310 may maintain a pointer (or use another technique) to identify an order of priority for requestors 210 in a current clock cycle.

EXEMPLARY REQUEST ARBITRATION PROCESS

Figure 12:
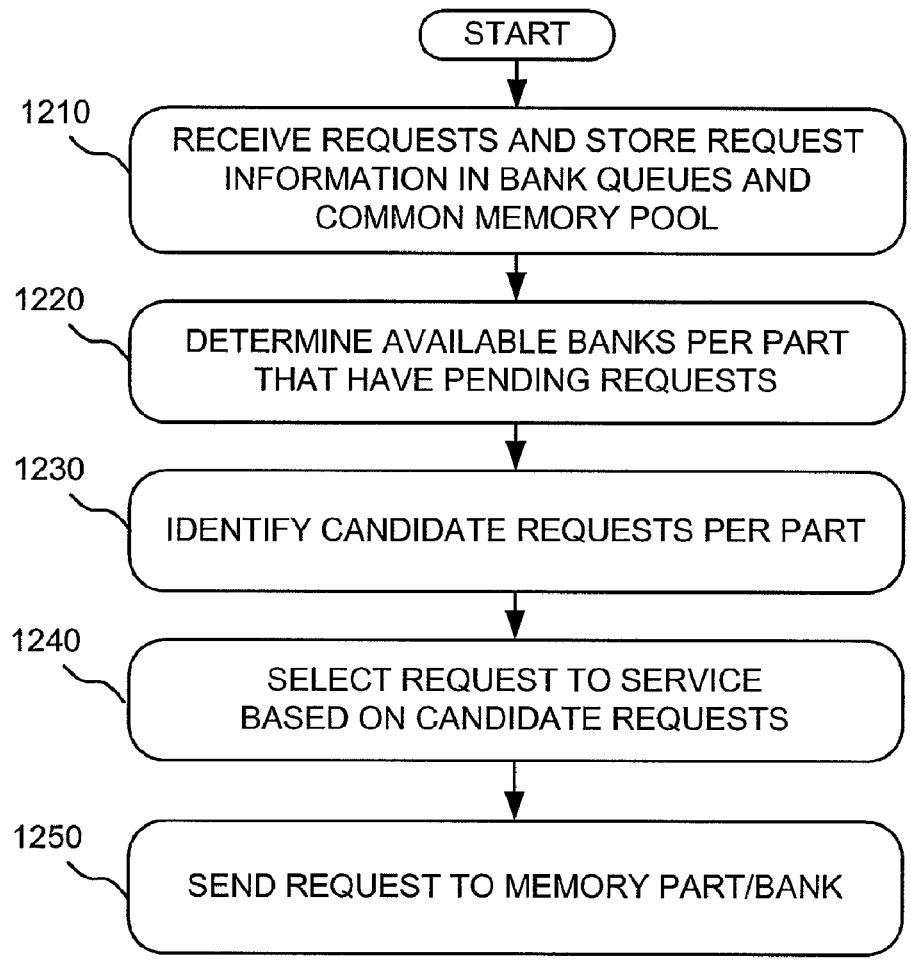
FIGS. 12 and 13 are flowcharts of exemplary processes for arbitrating among requests for access to memory.

FIG. 12 is a flowchart of an exemplary process for arbitrating among requests for access to control memory 150. In one implementation, the process described below may occur in a given clock cycle and may be repeated in subsequent clock cycles.

Processing may begin with requests being received and request information being stored in bank queues 720 and common memory pool 730 (block 1210). For example, during a given clock cycle, control block 310 may receive a set of requests from a corresponding set of requestors 210. Control block 310 may identify valid requests based, for example, on valid signals included with the requests.

Control block 310 may process a valid request from a requestor 210 to store information associated with the request (e.g., the address and a request ID) in common memory pool 730. Control block 310 may also analyze the lower ceiling ($\log_2 P$) bits of the address to identify a bank 412 for which the request is intended. Control block 310 may generate a bank vector for each of banks 412 that identifies one or more of requestors 210 from which a request was received during the given clock cycle that was intended for the corresponding bank 412. Control block 310 may store the bank vectors in the corresponding bank queues 720.

Banks 412 that are available (per memory part 410) and that contain a pending request may be determined (block 1220). For example, control block 310 may generate a result vector (FIG. 9) that may identify which banks 412 are available and have requests to be serviced for each memory part 410. Control block 310 may generate a combined bank vector by, for example, concatenating the bank vectors (FIG. 7) generated for a memory part 410. Control block 310 may also generate a replicated bank availability vector that may include, for example, each bit of the bank availability vector (FIG. 8) replicated to M bits. Control block 310 may generate the result vector by, for example, combining the combined bank vector and the replicated bank availability vector. In one implementation, control block 310 may perform a logical AND operation on the bits in the combined bank vector and the replicated bank availability vector to form the result vector.

Candidate requests per memory part 410 may be identified (block 1230). As explained above, memory 320 may include N memory parts 410 that operate independently of each other. Control block 310 may include a separate bus to each of memory parts 410 to permit N requests (if possible) to be sent to memory 320 in a single clock cycle.

Control block 310 may identify at least two candidate requests (e.g., a high priority request and a low priority request) for each of memory parts 410. Control block 310 may determine, based on the bank priority vector (FIG. 10) and the result vector, which pending request should be identified as the high priority request and which pending request should be identified as the low priority request based on banks 412 to which the requests are intended. The high priority request may identify the request that should go first if possible and the low priority request may identify the request that should go next if possible.

For example, the candidate requests might include:

| | |
|---|---|
| P1_HI | P1_LO, |
| P2_HI | P2_LO, ... |
| PN_HI | PN_LO, | where P1_HI refers to a high priority request candidate for memory part 410-1, P1_LO refers to a low priority request candidate for memory part 410-1, P2_HI refers to a high priority request candidate for memory part 410-2, P2_LO refers to a low priority request candidate for memory part 410-2, PN_HI refers to a high priority request candidate for memory part 410-N, and PN_LO refers to a low priority request candidate for memory part 410-N.

A request to be serviced may be selected from the candidate requests (block 1240). For example, control block 310 may choose the combination of candidate requests such that multiple requestors 210, multiple high priority requests, and multiple memory parts 410 are serviced in each clock cycle. Control block 310 may access the requestor priority vector (FIG. 11) to identify the priority order of requestors 210. In one implementation, control block 310 may identify a different priority order of requestors 210 for each of memory parts 410.

Due to the availability of banks 412, control block 310 may not be able to service high priority requests in every clock cycle. Thus, control block 310 may attempt to select the optimum combination of candidate requests. To select the optimum combination of candidate requests, control block 310 may give highest priority to trying to service all of memory parts 410, next highest priority to trying to service N requestors 210, and next highest priority to trying to service high priority.

Figure 13:
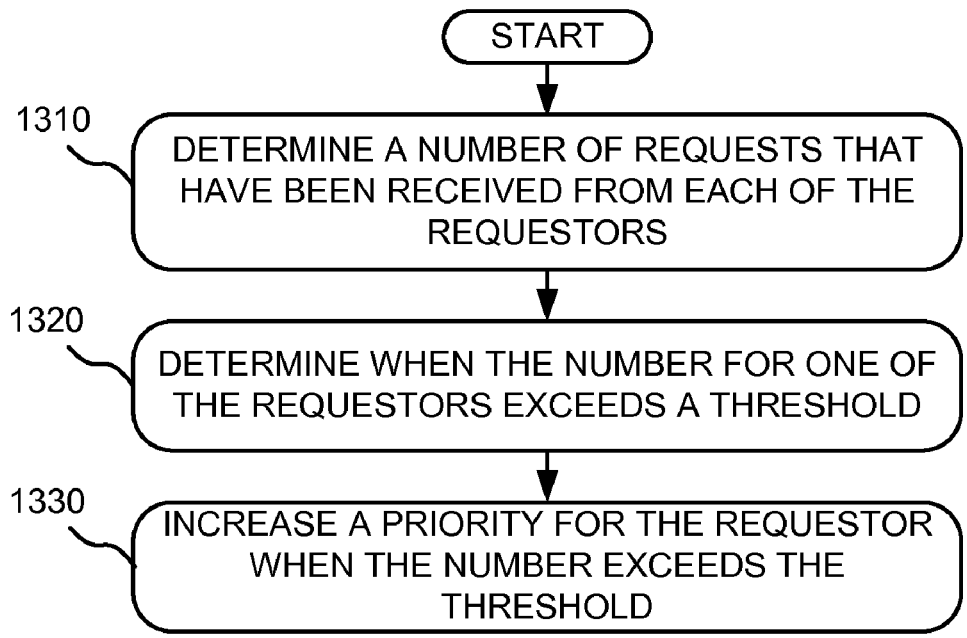

Control block 310 may also use information regarding the number of requests received from requestors 210 as a factor in selecting a request to be serviced. FIG. 13 is a flowchart of an exemplary process for factoring the number of requests received from requestors 210 to determine a request to service. In one implementation, a set of counters corresponding to requestors 210 may be maintained. The counters may track the number of requests received from the corresponding requestors 210 that have not yet been serviced (block 1310). When the number of requests from a particular one of requestors 210 exceeds a threshold (block 1320), this may be a sign that the particular requestor 210 is not being serviced fairly or that the particular requestor 210 is generating more requests than other ones of requestors 210. In this case, it may be beneficial to give that particular requestor 210 more opportunities to access memory 320. For example, that particular requestor 210 may be given a higher priority (block 1330). For example, the requestor priority vector (FIG. 11) may be modified to give that particular requestor 210 more opportunities to access memory 320. This may improve the delay through data processing device 100.

Control block 310 may also or alternatively use information regarding the depth of bank queues 720 as a factor in selecting a request to be serviced. When a bank queue 720 fills more than other bank queues 720, this may be a sign that a particular bank 412 is not being serviced fairly or that that bank 412 has more pending requests than other ones of banks 412. In this case, it may be beneficial to give that bank 412 more accesses. For example, a threshold may be set for bank queues 720. When the fullness of a bank queue 720 goes beyond the threshold, the corresponding bank 412 may be given a higher priority. For example, the bank priority vector (FIG. 10) associated with one or more of requestors 210 may be modified to give that bank 412 more accesses. This may improve the delay through data processing device 100.

Control block 310 may also or alternatively use information regarding reads and writes as a factor in selecting a request to be serviced. In one implementation, memory 320 may have a turnaround delay (e.g., one clock cycle where no operation can be performed on the bus to a memory part 410) every time there is a switch between a read and a write. To minimize delay, control block 310 may group read requests together and group write requests together. Typically, there may be many more requests to read from memory 320 than requests to write to memory 320. Accordingly, control block 310 may gather write requests until a number of write requests are collected. Control block 310 may then perform a burst of writes to memory 320.

Memory 320 may have a predetermined refresh constraint. The refresh constraint may indicate the intervals at which a refresh operation is performed. The length of the burst of writes may be programmable to guarantee that the burst finishes prior to the time that the next refresh operation is performed. The length of the burst of writes may be specified as a bus hold time. The bus hold time may be a programmable maximum amount of time that write requestor(s) can hold the bus for write requests.

A selected request may be sent to the appropriate bank 412 of a memory part 410 (block 1250). As explained above, control block 310 may include a separate bus to each of memory parts 410. In a given clock cycle, control block 310 may attempt to send a request to a bank 412 of each of memory parts 410. After sending a request to a bank 412, control block 310 may set counter 810 (FIG. 8) associated with that bank 412.

CONCLUSION

Implementations described herein may provide techniques for efficiently and fairly accessing a memory device. These techniques may operate within the constraints of the memory device while providing a random access pattern to multiple requestors, flexible bandwidth sharing, and minimal turnaround (e.g., read-write) delay.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 12, the order of the blocks may differ in other implementations. Also, non-dependent blocks may be performed in parallel.

Also, the preceding description referred to a data processing device that processes "packets." The data processing device may process any type or form of data unit, where a "data unit" may refer to packet or non-packet data.

Further, certain portions of the description referred to "logic" that performs one or more functions. This logic may include hardware, such as a processor, an application specific integrated circuit, or a field programmable gate array, software, or a combination of hardware and software.

It will also be apparent that aspects, as described above, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A data processing device, comprising:
   a memory that includes a plurality of banks;
   a plurality of requestors that generate requests for accessing the memory;
   a plurality of bank queues corresponding to the banks; and
   a control block to:
   receive the requests from the requestors,
   identify the banks to which the requests are intended,
   store first information associated with the requests in the bank queues corresponding to the identified banks,
   store second information associated with the requests in one or more locations of a common memory pool,
   generate a bank vector for each of the banks in the memory, where each of the bank vectors identifies one or more of the requestors generating requests for accessing the memory,
   generate a combined bank vector by concatenating the bank vectors for each of the banks in the memory,
   generate a bank availability vector that identifies which of the banks are available,
   generate a replicated bank availability vector that includes each bit of the bank availability vector,
   generate a result vector based on a combination of the combined bank vector and the replicated bank availability vector, where the result vector indicates that one or more of the banks are available and have a request to be serviced,
   select one or more of the requests to send to the memory based on the first information stored in the bank queues and the result vector, and
   send the selected one or more of the requests to the memory based on the second information stored in the common memory pool.

2. The data processing device of claim 1, where the memory includes a plurality of memory parts, each of the memory parts including a set of the banks.

3. The data processing device of claim 2, further comprising a plurality of buses between the control block and the memory parts, the control block to send a plurality of the requests to the memory parts via the buses during a same clock cycle.

4. The data processing device of claim 2, where the control block is further to:
   determine a plurality of candidate requests, each of the candidate requests being associated with a different one of the memory parts, and
   select a combination of the candidate requests for transmission to the memory parts.

5. The data processing device of claim 1, where each of the requests includes an address of a location in the memory to read or write data, the control block to store the addresses from the requests in the common memory pool.

6. The data processing device of claim 1, where each of the requests includes an address of a location in the memory to read or write data, the control block to:
   analyze the addresses from the requests to identify the banks to which the requests are intended, and
   store the bank vector, as part of the first information, in the bank queue corresponding to the one of the banks.

7. The data processing device of claim 6, where the bank vector includes a plurality of bits corresponding to the plurality of requestors, one of the bits being set to a first value to indicate that a request intended for the one of the banks was received from the corresponding requestor, or to a second value to indicate that a request intended for the one of the banks was not received from the corresponding requestor.

8. The data processing device of claim 1, where the control block is further to determine which of the banks are available during a particular clock cycle.

9. The data processing device of claim 1, further comprising:
   a plurality of counters corresponding to the banks, the counters having associated count values.

10. The data processing device of claim 9, where the control block is further to:
    determine the count values associated with the counters, and
    generate the bank availability vector based on the determined count values, the bank availability vector identifying one or more of the banks that are available during a particular clock cycle.

11. The data processing device of claim 1, where the control block is further to determine which of the banks are available and have a request to be serviced based on the first information in the bank queues and third information that identifies one or more of the banks that are available.

12. The data processing device of claim 1, where the control block is further to determine one of the requests to send to the memory from the requests received from the requestors based on the first information in the bank queues and priority information associated with the requestors or the banks.

13. The data processing device of claim 1, where the control block is further to:
    determine a number of requests that have been received from each of the requestors,
    determine when the number for one of the requestors exceeds a threshold, and
    increase a priority for the one of the requestors when the number exceeds the threshold.

14. The data processing device of claim 13, where the control block is further to arbitrate among the requests based on the first information in the bank queues and the increased priority of the one of the requestors.

15. The data processing device of claim 1, where the control block is further to:
set a threshold for each of the bank queues,
determine when a fullness of one of the bank queues exceeds the threshold, and
increase a priority of the corresponding bank when the fullness of the one of the bank queues exceeds the threshold.

16. The data processing device of claim 15, where the control block is further to arbitrate among the requests based on the first information in the bank queues and the increased priority of the corresponding bank.

17. The data processing device of claim 1, where the control block is further to:
identify the requests that are associated with reads as read requests,
identify the requests that are associated with writes as write requests,
gather the read requests together,
gather the write requests together, and
arbitrate among the requests based on the first information in the bank queues, the gathered read requests, and the gathered write requests.

18. The data processing device of claim 1, where the control block is further to:
identify the requests that are associated with reads,
identify the requests that are associated with writes, and
arbitrate among the requests based on the first information in the bank queues to minimize transitions between the read requests and the write requests.

19. The data processing device of claim 1, where a refresh operation is performed on the memory within one of a plurality of refresh intervals; and
where the control block is further to:
identify the requests that are associated with writes,
gather a number of the writes together to form a burst, and
transmit the burst prior to a next one of the refresh intervals.

20. The data processing device of claim 1, where the requests are associated with read and write requests.

21. A data processing device, comprising:
a memory that includes a plurality of banks;
a plurality of requestors that generate requests for accessing the memory; and
a control block to:
receive the requests from the requestors, where the requests are stored in a common memory pool,
determine, using a result vector:
the banks to which the requests are intended, and
one or more of the banks that are available,
store information in the common memory pool,
generate a bank vector for each of the banks in the memory, where each of the bank vectors identifies one or more of the requestors generating requests for accessing the memory,
generate a combined bank vector by concatenating the bank vectors for each of the banks in the memory,
generate a bank availability vector that identifies which of the banks are available,
generate a replicated bank availability vector that includes each bit of the bank availability vector,
generate the result vector based on a combination of the combined bank vector and the replicated bank availability vector, where the result vector indicates that one or more of the banks are available and have a request to be serviced,
select one or more of the requests to send to the memory based on the result vector, and
send the selected one or more requests stored in the common memory pool to the memory based on the information stored in the common memory pool.

22. The data processing device of claim 21, where the memory includes a plurality of memory parts, each of the memory parts including a set of the banks.

23. The data processing device of claim 22, further comprising a plurality of buses between the control block and the memory parts, the control block to send a plurality of the requests to the memory parts via the buses during a same clock cycle.

24. The data processing device of claim 22, where the control block is further to:
determine a plurality of candidate requests, each of the candidate requests being associated with a different one of the memory parts, and
select a combination of the candidate requests for transmission to the memory parts.

25. The data processing device of claim 21, where the requests include addresses associated with locations in the memory, the control block to:
analyze the addresses to identify the banks to which the requests are intended, and
store the bank vector in one of the plurality of bank queues corresponding to the one of the banks.

26. The data processing device of claim 25, where the bank vector includes a plurality of bits corresponding to the plurality of requestors, one of the bits being set to a first value to indicate that a request intended for the one of the banks was received from the corresponding requestor, or to a second value to indicate that a request intended for the one of the banks was not received from the corresponding requestor.

27. The data processing device of claim 21, further comprising:
a plurality of counters corresponding to the banks, the counters having associated count values;
where the control block is further to:
determine the count values associated with the counters, and
generate the bank availability vector based on the determined count values, the bank availability vector identifying the one or more of the banks that are available during a particular clock cycle.

28. The data processing device of claim 21, where the control block is further to determine one of the requests to send to the memory from the requests received from the requestors based on which of the one or more of the banks are available and have a request to be serviced and priority information associated with the requestors or the banks.

29. The data processing device of claim 21, where the control block is further to:
identify the requests that are associated with reads as read requests,
identify the requests that are associated with writes as write requests,
gather the read requests together,
gather the write requests together, and
arbitrate among the requests based on which of the one or more of the banks are available and have a request to be serviced, the gathered read requests, and the gathered write requests.

30. The data processing device of claim 21, where the control block is further to:
identify the requests that are associated with reads,
identify the requests that are associated with writes, and arbitrate among the requests based on which of the one or more of the banks are available and have a request to be serviced while minimizing transitions between the reads and the writes.

31. The data processing device of claim 21, where a refresh operation is performed on the memory within one of a plurality of refresh intervals; and where the control block is further to:
identify the requests that are associated with writes,
gather a number of the writes together to form a burst, and
transmit the burst prior to a next one of the refresh intervals.

32. The data processing device of claim 21, where the requests are associated with read and write requests.

33. A device, comprising:
a memory that includes a plurality of memory parts, each of the memory parts including a plurality of banks;
a plurality of requestors to issue requests for accessing the memory; and
a control block connected to the plurality of memory parts via a corresponding plurality of buses, the control block to:
receive the requests, where the requests are stored in a common memory pool,
determine, using a result vector, the banks:
to which the requests are intended, and
that are available for each of the plurality of memory parts;
generate a bank vector for each of the banks in the memory, where each of the bank vectors identifies one or more of the requestors issuing requests for accessing the memory;
generate a combined bank vector by concatenating the bank vectors for each of the banks in the memory;
generate a bank availability vector that identifies which of the banks are available;
generate a replicated bank availability vector that includes each bit of the bank availability vector;
generate the result vector based on a combination of the combined bank vector and the replicated bank availability vector, where the result vector indicates that one or more of the banks are available and have a request to be serviced;
select one or more of the requests to transmit to the memory based on the result vector; and
transmit the selected one or more requests stored in the common memory pool via one or more of the buses based on the information stored in the common memory pool.

34. The device of claim 33, where the requests are associated with read and write requests.

35. A method performed by a device that includes a memory and a plurality of requestors, the memory including a plurality of memory parts, each of the memory parts including a plurality of banks, the requestors issuing requests for accessing the memory, the method comprising:
receiving the requests from the requestors, where the requests are stored in a common memory pool;
determining, using a result vector, the banks:
to which the requests are intended, and
that are available for each of the plurality of memory parts;
generating a bank vector for each of the banks in the memory, where each of the bank vectors identifies one or more of the requestors issuing requests for accessing the memory;
generating a combined bank vector by concatenating the bank vectors for each of the banks in the memory;
generating a bank availability vector that identifies which of the banks are available;
generating a replicated bank availability vector that includes each bit of the bank availability vector;
generating the result vector based on a combination of the combined bank vector and the replicated bank availability vector, where the result vector indicates that one or more of the banks are available and have a request to be serviced;
selecting one or more of the requests to transmit to the memory based on the result vector; and
transmitting the selected one or more requests stored in the common memory pool to the memory based on the information stored in the common memory pool.

36. The method of claim 35, where the requests are associated with read and write requests.

37. A method performed by a device that includes a memory and a plurality of requestors, the memory including a plurality of memory parts, each of the memory parts including a plurality of banks, the requestors issuing requests for accessing the memory, the method comprising:
receiving the requests from the requestors, where the requests are stored in a common memory pool;
determining, using a result vector, the banks:
to which the requests are intended, and
that are available for each of the plurality of memory parts;
generating a bank vector for each of the banks in the memory, where each of the bank vectors identifies one or more of the requestors issuing requests for accessing the memory;
generating a combined bank vector by concatenating the bank vectors for each of the banks in the memory;
generating a bank availability vector that identifies which of the banks are available;
generating a replicated bank availability vector that includes each bit of the bank availability vector;
generating the result vector based on a combination of the combined bank vector and the replicated bank availability vector, where the result vector indicates that one or more of the banks are available and have a request to be serviced;
selecting, based on the result vector, a plurality of the requests to transmit to the memory so that multiple ones of the memory parts are serviced in a given clock cycle; and
transmitting the selected requests stored in the common memory pool to the memory in the given clock cycle.

38. The method of claim 37, where the requests are associated with read and write requests.

* * * * *